United States Patent [19]

Blaisdell et al.

[11] 4,046,218

[45] Sept. 6, 1977

[54] FLOATING STEERING AXLE

[75] Inventors: Donald S. Blaisdell, Dallas, Oreg.; Llewellyn L. Walter, Perry, Ohio

[73] Assignee: Towmotor Corporation, Mentor, Ohio

[21] Appl. No.: 716,741

[22] Filed: Aug. 23, 1976

[51] Int. Cl.² .............................................. B62D 5/10
[52] U.S. Cl. ..................................... 180/155; 280/111
[58] Field of Search ............... 180/154, 155, 156, 157, 180/158, 159, 43 R, 44 R, 46, 48; 280/673, 111; 92/161

[56] References Cited

U.S. PATENT DOCUMENTS

| 3,137,360 | 6/1964 | Biedess | 180/159 X |
|---|---|---|---|
| 3,480,100 | 11/1969 | Gaulke | 180/155 |
| 3,768,585 | 10/1973 | Matteo | 180/154 |

Primary Examiner—Joseph F. Peters, Jr.
Assistant Examiner—John A. Pekar
Attorney, Agent, or Firm—Wegner, Stellman, McCord, Wiles & Wood

[57] ABSTRACT

A steering axle for a vehicle, such as a lift truck, has a frame for supporting the king pins and steering knuckles for mounting the steering wheels to the vehicle. A power steering actuator, such as a hydraulic cylinder, has a rod connected to said knuckles for turning the wheels upon demand. The cylinder is carried by the frame in a manner to permit the cylinder to move in response to changes in loading on the vehicle frame through the ability of the cylinder to translate vertically in response to said loading.

12 Claims, 4 Drawing Figures

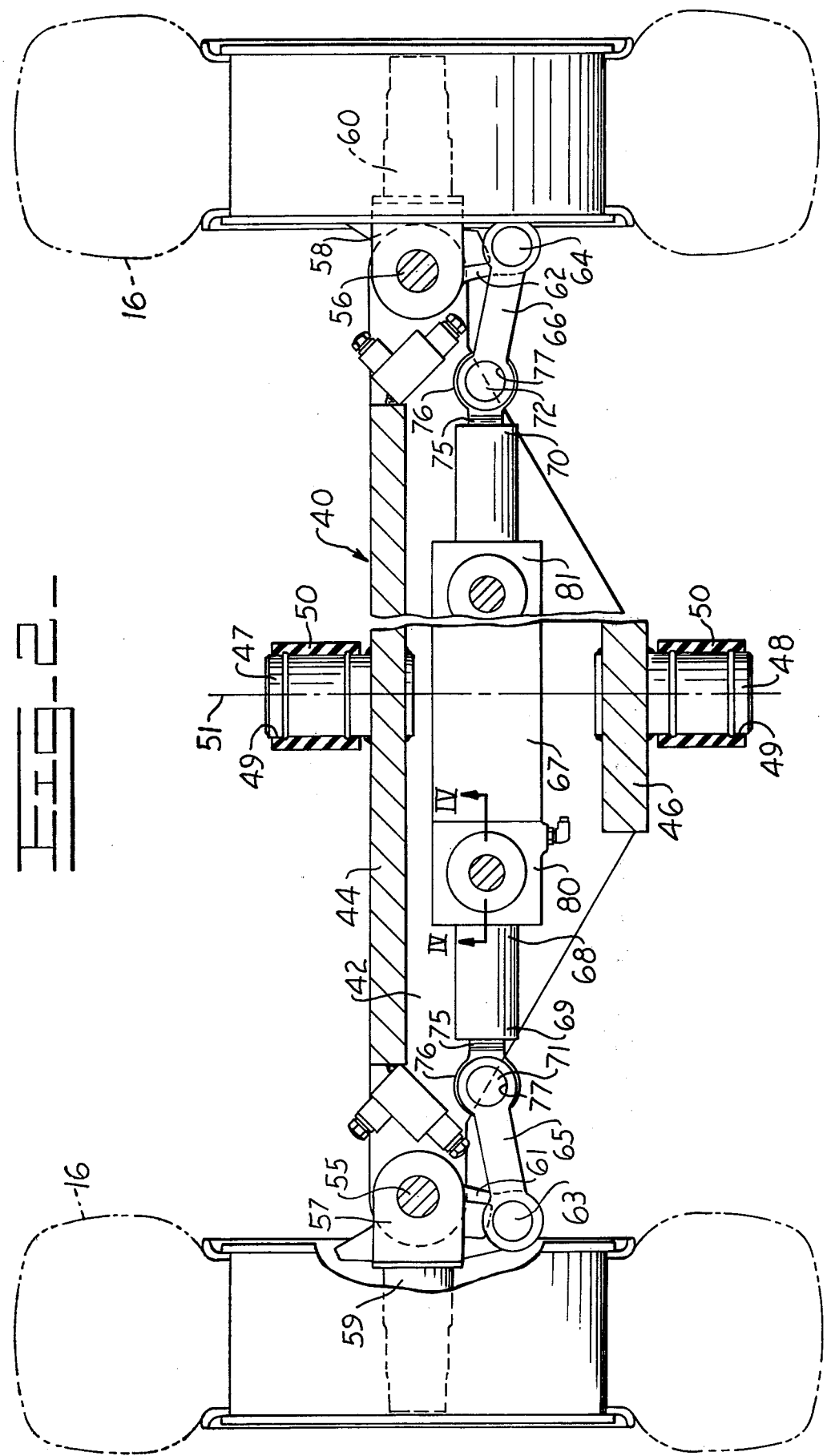

FLOATING STEERING AXLE

BACKGROUND OF THE INVENTION

1. Field of the Invention

This invention relates to steering apparatus for a vehicle and, more particularly, to a self-aligning support structure for a rod and cylinder of a power steering unit for use in a lift truck or the like.

2. Description of the Prior Art

Steering apparatus for certain vehicles, such as lift trucks and the like, is arranged to turn the vehicle by operating on the rear wheels of the vehicle which are beneath the counterweighted end of the vehicle. In this way, there is an unusually heavy load on the steering wheels necessitating different steering actuating apparatus than normally used. One prior system, as shown in U.S. Pat. No. 3,480,100 to G. L. Gaulke, provides for a double ended actuator unit rigidly mounted on the frame of the steering axle, said frame being resiliently mounted by rubber cushions to the body of the vehicle. Due to the rigid mounting on the double ended rod and cylinder, any misalignment between the rod of the actuator unit and the steering arm of the steering knuckle can cause the system to bind or to wear excessively.

In another prior art device, as shown in U.S. Pat. No. 3,768,585 to N. J. Matteo, a power steering unit is known on a lift truck wherein a double ended actuator unit is supported on bearings seated in elongate slots in the frame of the steering axle so as to permit the cylinder to move to a limited extent along the axis of the slots as the wheels are turned. Although this system does provide for some horizontal adjustment for misalignment between the rod of the actuator unit and the steering arm of the steering knuckle, it only provides for adjustments for misalignment in the horizontal plane and does not provide for adjustments for misalignment in the vertical plane where most adjustments are needed.

SUMMARY OF THE INVENTION

We have provided a steering axle for a vehicle wherein the power steering cylinder and rod are supported with respect to the axle frame so as to provide for self-adjustment in the vertical plane between the operative parts of the steering system. Shims are provided between the ends of a lower pair of pins and the closed ends of the lower chambers or bores so as to support the cylinder relative to the axle frame during normal loading of the vehicle. An upper pair of pins are carried by the cylinder and extend into chambers or bores formed in the axle frame such that misalignment of the rod of the cylinder, such as will occur during heavy loading of the vehicle, will move the pins in the chambers or bores whereupon the rod will self-adjust into proper alignment.

Adjustments are provided between the double ended rod of the cylinder and the tie link so as to adjust the position of the wheels for accurate turning.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 2 is an enlarged top view of the steering axle and wheels shown removed from the vehicle;

DESCRIPTION OF THE PREFERRED EMBODIMENT

Figure 1:
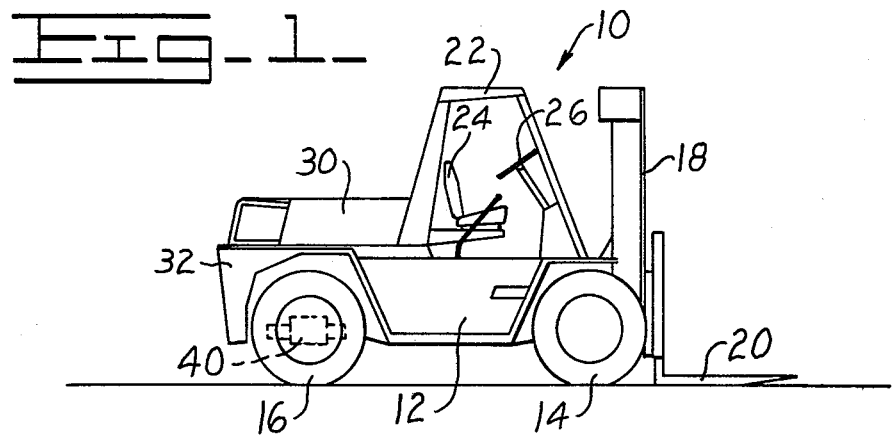
FIG. 1 is a side elevational view of a lift truck incorporating a steering axle of our invention.

Referring to the drawings, and in particular to FIG. 1, a forklift 10 is illustrated and has body portion 12, front wheels 14 and rear wheels 16. A mast 18 is mounted on the front of the vehicle and contains an operative mechanism for raising and lowering a fork 20 carried thereon. A cab 22 is positioned on the vehicle body 12 and has an operator seat 24 and a steering wheel 26 enclosed therein. The vehicle body 12 contains an engine compartment 30 and counterweights 32 which are located substantially over the rear wheels 16 of the vehicle. Shown in phantom, with respect to the rear wheels 16, is a steering axle 40 which is operatively connected to the steering apparatus so as to effect changing of the direction in which the vehicle is being propelled.

Figure 3:
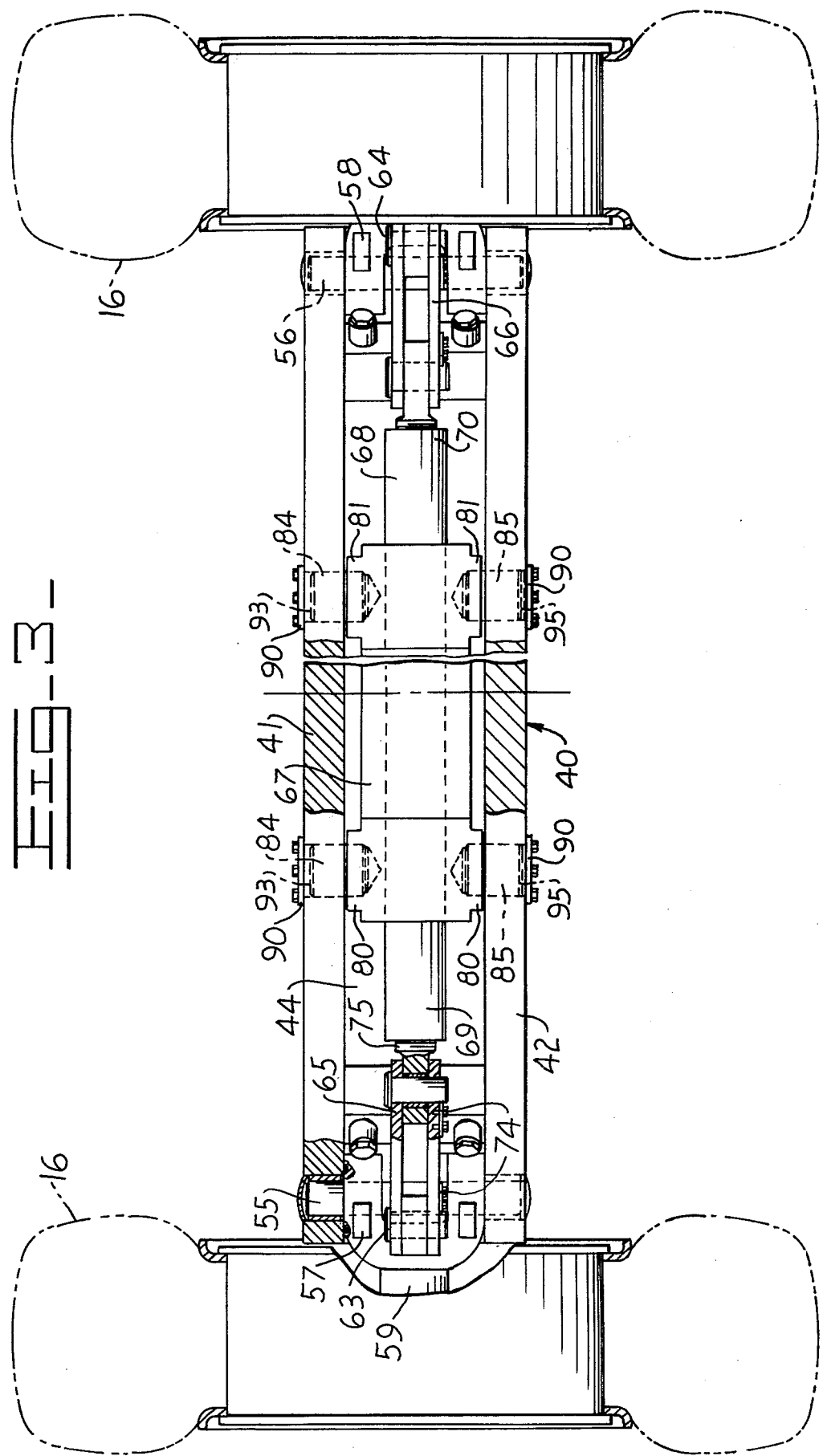
FIG. 3 is an elevational view of the steering axle shown in FIG. 2 with some parts broken away and in section.

Referring more specifically to FIG. 2 and 3, the steering axle 40 is comprised of an upper member 41 and a lower member 42, said upper and lower members 41,42 are shaped somewhat in the form of truncated triangles, as shown in FIG. 2. A front web member 44 and a rear web member 46 are connected between the upper and lower members 41 and 42 to form a steering axle frame. A forward and rearward projecting mounting spindle 47 and 48 are secured to the front and rear web members 44 and 46, respectively, with the projecting portions thereof being received an openings 49 in support brackets 50 projecting downwardly from the bottom of the body 12 of the vehicle. The steering axle 40 is permitted to turn about the horizontally disposed longitudinal axis 51 of the spindles 47 and 48, thus permitting one rear wheel 16 to raise as the other rear wheel lowers about said longitudinal axis 51 of the spindles 47 and 48.

A pair of conventional king pins 55 and 56 are seated in bushings in openings in the upper and lower members 41 and 42 near the outer end portions of said upper and lower members 41 and 42. Steering knuckles 57 and 58 are pivotally mounted, respectively, on the king pins 55 and 56 and have spindles 59,60 projecting outwardly therefrom upon which the wheels 16 are mounted for rotation about the axis of said spindles. The steering knuckles 57 and 58 also have outwardly projecting steering arms 61,62 the outer ends of which are pivotally fastened by pivot pins 63,64 to one end of the tie links or tag links 65 and 66.

Mounted between the upper members 41 and the lower member 42 of the steering axle 40 is a steering cylinder 67 through which extends the double ended rod 68. The cylinder 67 is connected to a source of hydraulic fluid in a conventional fashion such that application of hydraulic fluid to the cylinder 67 will cause the double ended rod 68 to move in one direction or the other depending upon the direction of flow in the fluid. The outer end portions 69,70 of the rod 68 are pivotally connected to the other ends of the tag links 65 and 66 by means of pins 71,72 passing through aligned apertures therein. The pins 63,64 and 71,72 are secured in position by means of retaining plates 74 being secured to the lower face of the tag links 65,66 and having a shaped portion in engagement with an undercut portion of each pin to hold the pin assembled with the link. The connection between the rod 68 and the links 65,66 is effected by means of a short threaded extension 75 which is threaded into the ends of the end portions 69,70 of the rod 68. Said extension 75 has a tongue portion 76 extending axially outwardly from each end therefrom with an aperture 77 therethrough for receiving the pin 71 or 72 for connecting said end of the rod to the link 65 or 66. The threaded extension 75 of the rod 68 is provided for adjusting the relative positions of the rod 68 with respect to the wheels 16 so as to adjust the relative positions of the wheels with respect to each other.

Figure 4:
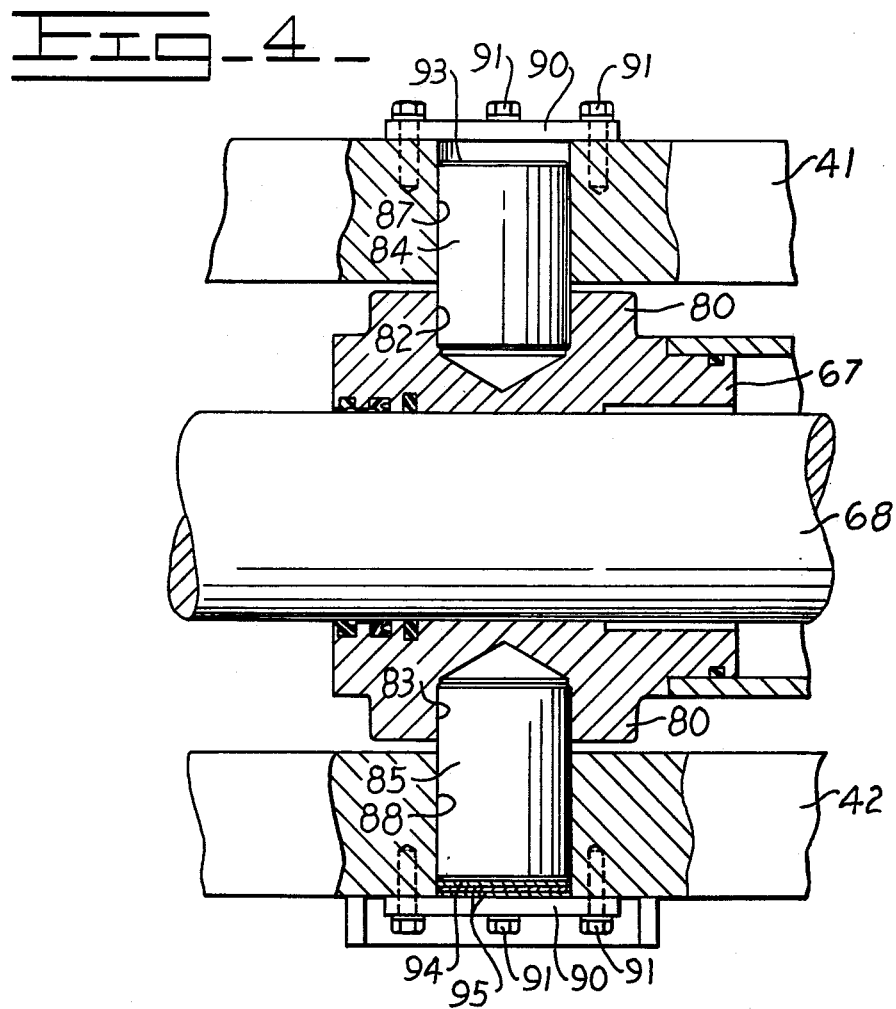
FIG. 4 is an enlarged partial cross-sectional view taken along the lines 4—4 of FIG. 2.

The steering cylinder 67 is carried by the steering axle 40 by means of our improved self-aligning structure, one of which is shown enlarged and in section in FIG. 4. The steering cylinder 67 has enlarged radially extending portions 80 and 81, formed on opposite ends of the cylinder, each radially extending portion 80 and 81 having a pair of diametrically aligned blind bores 82,83 formed radially inwardly from the outer surface thereof. The upper member 41 and the lower member 42 of the steering frame have bores 87,88 respectively, formed therethrough. The blind bores 82 open upwardly and align with the bores 87 in the upper member 41 with an upper pin 84 being slidably received in said bores 82,87. The blind bores 83 open downwardly and align with the bores 68 in the lower members 42 with a lower pin 85 being slidably received in said bores 83,88. A cap 90 is provided for covering the one end of each bore 87 and 88, which cap is affixed to the frame member by passing an appropriate number of bolts 91 through the cap 90 and into the upper or lower member 41,42. The upper pins 84 are bottomed in bores 82 with clearance provided between the upper end 93 of the pin 84 and the inside of the cap 90, which clearance permits the pins 84 to move vertically in bore 87 when the cylinder 67 is deflected.

The lower pins 85 are bottomed in the blind bores 83 in the cylinder 67 with the end 94 of the pin being spaced from the inside of the cap 90 by shims 95. The thickness of the shims 95 needed between the pins 85 and the caps 90 is determined when the vehicle is substantially level and unloaded, whereupon sufficient shimming is added between the caps 90 and the pins 85 to eliminate play between the rod 68 and the links 65,66 and steering knuckles 57,58 connected to the wheels 16. Displacement of the rod 68 up or down will displace the cylinder 67 up or down, which displacement will move the upper pins 84 up and down in bores 82. Since the bores 82,83 in the cylinder 67 align with the bores 87,88 in the respective upper member 41 and lower member 42, the movement of the pins 84 and 85 and of the cylinder 67 is confined to the vertical plane containing the axis of the pins 84 and 85 and the axis of the cylinder 67. In use, as the steering cylinder 67 is actuated, the rod 68 moves in one direction or the other to effect steering of the vehicle. The knuckles 57,58 links 65,66 and ends 69,70 of the rod 68 can become misaligned due to heavy loading of the vehicle, due to wear and the like, such that the rod 68 no longer moves along the same path as originally established, whereupon the pins 84 will permit the cylinder 67 and double ended rod 68 to shift in the vertical plane relative to the steering axis 40 so as to accommodate for the misalignment of the parts. The shims 95 and pins 85 limit the amount of play and support the cylinder 67 and rod 68 from below while permitting vertical movement of the cylinder 67 and rod 68 upwardly therefrom. The rod 68 is therefore not loaded radially and is free to function axially. The shifting of the pins 84 in the bores 87 provides a self-aligning function for the steering apparatus. The self-aligning function eliminates misalignment of the connected parts and, therefore, eliminates binding, stress and needless wear on the moving parts of the steering apparatus.

The threaded adjustment between the end extensions 75 of the rod 68 and the tag links 65,66 makes it possible to adjust the system for additional wheel alignment which, when combined with the self-aligning support for the cylinder 67 and rod 68, creates a long life power steering system not heretofore available.

What is claimed is:

1. In a steering axle for a vehicle, said steering axle having a frame with an upper member, a lower member and front and rear web members joining said upper and lower members, a king pin at each end portion of said frame extending between said upper and lower members, a steering knuckle pivotally mounted on each of said king pins and having a wheel rotatably mounted on an outwardly projecting spindle portion thereof, a tag link connected to an extended portion of each of said knuckles, a steering cylinder carried between said upper and lower members, a double ended rod extending from said cylinder and having ends connected to said tag links, and means on said frame for supporting said cylinder for vertical movement in a self-aligning relationship relative to said tag links.

2. In a steering axle as claimed in claim 1 wherein said means comprises at least one radially extending pin carried by said cylinder, said pin being slidably disposed in a vertically disposed, axially aligned bore in said frame whereby vertical movement of said pin in response to axle deflection is permitted.

3. In a steering axle as claimed in claim 1 wherein said means comprises four radially extending pins carried in blind bores in said cylinder, each one of said pins being slidable in a vertically disposed, axially aligned bore in said frame whereby said pins permit the cylinder to move in a vertical direction in response to axle deflection.

4. In a steering axle as claimed in claim 3 wherein two of said bores in said frame are in the lower member of said frame and shims are provided in said bores in said lower member between said pins and caps on said frame to limit downward deflection of said axle.

5. In a steering axle as claimed in claim 1 wherein means are provided between said rod and said tag links for adjusting the distance therebetween whereby said wheels are aligned.

6. In a steering axle as claimed in claim 1 wherein said self-aligning relationship is in a vertical plane containing the longitudinal axis of said cylinder.

7. In a steering axle for a vehicle, said steering axle having a frame with an upper member, a lower member and front and rear web members, joining said upper and lower members, a king pin at each end portion of said frame extending between said upper and lower members, a steering knuckle pivotally mounted on each of said king pins and having a wheel rotatably mounted on an outwardly projecting spindle portion thereof, a tag link connected to an extended portion of each of said knuckles, a steering cylinder between said upper and lower members, a double ended rod extending from said cylinder and having the ends connected to said tag links, and means on said frame for supporting said cylinder in a self-aligning relationship relative to said frame, said means comprises at least two oppositely extending pins carried by said cylinder, said pins seating in aligned bores in said frame whereby said pins permit self-alignment of said rod with said tag links.

8. In a steering axle for a vehicle having a body, said steering axle being carried by said body and supporting a pair of steering wheels on the outer end portions thereof, said steering axle having a frame with an upper member and a lower member, a steering cylinder having a longitudinal axis and being located between said upper and lower members, a double ended rod extending from said cylinder and being connected to linkage means for operatively turning said steering wheels, and means on said frame for supporting said cylinder for movement in a vertical plane with said longitudinal axis remaining parallel to the initial position of said longitudinal axis as said cylinder is moved in said vertical plane.

9. In a steering axle for a vehicle having a body, said steering axle being carried by said body and supporting a pair of steering wheels on the outer end portions thereof, said steering axle having a frame with an upper member and a lower member, a steering cylinder located between said upper and lower members, a double ended rod extending from said cylinder and being connected to linkage means for operatively turning said steering wheels, and means on said frame for supporting said cylinder in a movable relationship relative to said frame, said last-named means comprises a pair of diametrically aligned radially extending pins carried by said cylinder, one of said pins having a portion slidable in a bore in said upper member and the other of said pins having a portion slidable in a bore in said lower member.

10. In a steering axle as claimed in claim 9 wherein shims are provided in said bore in the lower member for limiting downward deflection of said rod and cylinder.

11. In a steering axle as claimed in claim 9 wherein the axes of said radially extending pins lie in a vertical plane containing the longitudinal axis of said cylinder.

12. In a steering axle for a vehicle having a body, said steering axle being carried by said body and supporting a pair of steering wheels on the outer end portions thereof, said steering axle having a frame with an upper member and a lower member, a steering cylinder located between said upper and lower members, a double ended rod extending from said cylinder and being connected to linkage means for operatively turning said steering wheels, means on said frame for supporting said cylinder in a movable relationship relative to said frame, and means are provided for adjusting the distance between said rod and said linkage means whereby the alignment of the wheels is adjusted.

* * * * *

UNITED STATES PATENT AND TRADEMARK OFFICE
CERTIFICATE OF CORRECTION

PATENT NO. : 4,046,218

DATED : September 6, 1977

INVENTOR(S) : Donald S. Blaisdell and Llewellyn L. Walter

It is certified that error appears in the above-identified patent and that said Letters Patent are hereby corrected as shown below:

Column 1, line 28, "known" should be --shown--.

Column 2, line 38, "an" should be --in--; and line 57, "members" should be --member--.

Signed and Sealed this

Thirteenth Day of December 1977

[SEAL]

Attest:

RUTH C. MASON
*Attesting Officer*

LUTRELLE F. PARKER
*Acting Commissioner of Patents and Trademarks*